United States Patent
Case et al.

(10) Patent No.: US 7,979,841 B2
(45) Date of Patent: Jul. 12, 2011

(54) PROGRAMMATICALLY DETERMINING CALLING INFORMATION OF A GRAPHICAL PROGRAM

(75) Inventors: Jason B. Case, Austin, TX (US); Robert E. Dye, Austin, TX (US); Kyle P. Gupton, Austin, TX (US); José A. Hernandez, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 1886 days.

(21) Appl. No.: 10/826,740

(22) Filed: Apr. 16, 2004

(65) Prior Publication Data

US 2005/0028138 A1 Feb. 3, 2005

Related U.S. Application Data

(60) Provisional application No. 60/490,462, filed on Jul. 28, 2003.

(51) Int. Cl.
*G06F 9/44* (2006.01)

(52) U.S. Cl. ........ 717/105; 717/109; 717/113; 717/114; 717/116; 715/763

(58) Field of Classification Search .................. 717/105, 717/109, 113
See application file for complete search history.

(56) References Cited

U.S. PATENT DOCUMENTS

| | | | | |
|---|---|---|---|---|
| 5,179,698 | A * | 1/1993 | Bachman et al. | 707/4 |
| 5,195,178 | A * | 3/1993 | Krieger et al. | 715/809 |
| 5,212,771 | A * | 5/1993 | Gane et al. | 715/854 |
| 5,371,513 | A * | 12/1994 | Drako et al. | 345/620 |
| 5,377,318 | A * | 12/1994 | Wolber | 715/809 |
| 5,408,603 | A * | 4/1995 | Van de Lavoir et al. | 715/763 |
| 5,487,143 | A * | 1/1996 | Southgate | 715/790 |
| 5,850,548 | A | 12/1998 | Williams | |
| 6,102,965 | A | 8/2000 | Dye et al. | |
| 6,684,385 | B1 | 1/2004 | Bailey et al. | |
| 6,754,885 | B1 * | 6/2004 | Dardinski et al. | 717/113 |
| 6,763,515 | B1 * | 7/2004 | Vazquez et al. | 717/109 |
| 7,058,899 | B2 * | 6/2006 | Petruk et al. | 715/763 |
| 7,089,530 | B1 * | 8/2006 | Dardinski et al. | 717/105 |
| 7,231,639 | B1 * | 6/2007 | Garner et al. | 719/310 |

(Continued)

OTHER PUBLICATIONS

Title: Towards a visual programming environment for software development, author:: Roy G. G et al, dated: Jan. 26, 1998, source: IEEE.*

(Continued)

*Primary Examiner* — Chameli C Das
(74) *Attorney, Agent, or Firm* — Meyertons Hood Kivlin Kowert & Goetzel, P.C.; Jeffrey C. Hood; Jason L. Burgess

(57) ABSTRACT

A system and method for programmatically determining interface information for a graphical program. Interface information for a graphical program may include information necessary to invoke execution of the graphical program. A first program may receive a request for information regarding an interface of a graphical program. In response to the request, the first program may programmatically determine the information regarding the interface of the graphical program. The interface information may include such information as parameters of the graphical program, their respective data types, whether each parameter is an input parameter, an output parameter, or both, and default values for input parameters. The programmatically determined information regarding the interface of the graphical program may then be returned to a second program. The second program may invoke execution of the graphical program according to the received information.

22 Claims, 8 Drawing Sheets

U.S. PATENT DOCUMENTS

| | | | |
|---|---|---|---|
| 7,657,552 B2 * | 2/2010 | Welcker et al. | 707/999.102 |
| 7,801,635 B2 * | 9/2010 | Funk et al. | 700/121 |
| 2001/0020291 A1 * | 9/2001 | Kudukoli et al. | 717/1 |
| 2001/0034879 A1 * | 10/2001 | Washington et al. | 717/1 |
| 2001/0034881 A1 * | 10/2001 | Washington | 717/5 |
| 2001/0035879 A1 * | 11/2001 | Washington et al. | 345/763 |
| 2002/0196283 A1 * | 12/2002 | Petruk et al. | 345/763 |
| 2003/0231211 A1 * | 12/2003 | Shah et al. | 345/771 |
| 2004/0158557 A1 * | 8/2004 | Welcker et al. | 707/3 |
| 2005/0251789 A1 * | 11/2005 | Peck et al. | 717/113 |
| 2006/0053407 A1 * | 3/2006 | Kodosky et al. | 717/105 |
| 2006/0143570 A1 * | 6/2006 | Washington et al. | 715/763 |
| 2006/0259871 A1 * | 11/2006 | Washington et al. | 715/763 |
| 2009/0183140 A9 * | 7/2009 | Peck et al. | 717/113 |
| 2009/0228864 A1 * | 9/2009 | Washington et al. | 717/105 |

OTHER PUBLICATIONS

Title: Advances in visual programming, author: Hirakawa, M, et al, dated: Jun. 15, 1992, source: IEEE.*

* cited by examiner

Computer System
82

Averaged DC-RMS for 1 Chan.vi

Calculates the DC and/or the RMS values of an input waveform or array of waveforms. You can use this polymorphic VI to calculate DC and RMS values on single channel or multichannel data. The data type you wire to the signal in input determines the polymorphic instance to use.

PROGRAMMATICALLY DETERMINING CALLING INFORMATION OF A GRAPHICAL PROGRAM

PRIORITY INFORMATION

This application claims the benefit of priority of U.S. Provisional Application No. 60/490,462 titled "Programmatically Determining Calling Information of a Graphical Program," whose inventors were Robert E. Dye, Jason B. Case, Jose A. Hernandez, and Kyle P. Gupton, filed on Jul. 28, 2003.

FIELD OF THE INVENTION

The present invention relates to the field of graphical programming, and more particularly to a system and method for programmatically determining calling information of a graphical program.

DESCRIPTION OF THE RELATED ART

Traditionally, high level text-based programming languages have been used by programmers in writing application programs. Many different high level text-based programming languages exist, including BASIC, C, JAVA, FORTRAN, PASCAL, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities that a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, BASIC, JAVA, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In some instances, it is necessary to invoke execution of a graphical program from another software application. The software application that invokes execution of the graphical program may itself be a graphical program, or it may be a text-based program. As one example, a test executive software application may need to invoke execution of a graphical program to perform a test of a unit under test. In the prior art, the software application that invokes execution of the graphical program typically possesses knowledge of the graphical program's calling information or interface, such as its parameters and their data types. Thus, to invoke execution of the graphical program, the software application may perform a call according to the known calling information or interface, e.g., may perform a function or method call that includes the correct parameters with the correct data types.

In some cases however, the calling information or interface of the graphical program may not be known to the software application. In these cases, it would be desirable to enable the software application to dynamically discover the calling information of the graphical program. The software application could then formulate a function or method call to invoke execution of the graphical program by using the dynamically discovered calling information.

SUMMARY

One embodiment of the present invention comprises a system and method for programmatically determining information regarding an interface of a graphical program. The interface information for the graphical program may include information necessary to invoke execution of the graphical program. Thus, the interface information is also referred to herein as "calling information". The interface information may include such information as parameters of the graphical program, their respective data types, whether each parameter is an input parameter, an output parameter, or both, and default values for input parameters.

A first program may receive a request for information regarding an interface of a graphical program. In one embodiment, the first program may have an associated method or function that a second program may call to request the first program to programmatically determine the information regarding the interface of the graphical program. Thus, receiving the request for information regarding the interface of the graphical program may comprise this method or function being invoked. In another embodiment, receiving the request for information regarding the interface of the graphical program may comprise the first program receiving the request in other ways, such as a message request received via a network. For example, the first program may support a communication protocol allowing the second program to send a message requesting the interface information for the graphical program.

In response to the request, the first program may programmatically determine the information regarding the interface of the specified graphical program(s). For example, the first program may retrieve or access one or more data structures representing the graphical program and may programmatically analyze the one or more data structures to determine the information regarding the interface of the graphical program. In another embodiment, the first program may not determine the interface information from data structures that directly represent the graphical program, but may instead determine the interface information from other information. For example, in one embodiment the first program may determine the interface information from a file or database that stores interface information or meta-data regarding various graphical programs.

As described above, programmatically determining the interface information may include programmatically determining parameters for invoking the graphical program. Data types of the parameters may also be programmatically determined. In one embodiment, one or more of the parameters may have default values. Thus, default values for the parameters may also be programmatically determined.

The programmatically determined information regarding the interface of the graphical program may then be returned. For example, if the request for the interface information was received in a method or function call, the programmatically determined information may be returned to the caller of the method or function using standard techniques. If the request was received in a message sent via a network (or passed from another program), the programmatically determined information may be sent to the sender of the original message in a response message.

In accordance with the above description, a second embodiment of the invention may comprise a method in which a second program programmatically requests information regarding an interface of a graphical program. The second program may receive information regarding the interface of the graphical program in response to the request and may invoke execution of the graphical program according to the received information.

BRIEF DESCRIPTION OF THE DRAWINGS

A better understanding of the present invention can be obtained when the following detailed description of the preferred embodiment is considered in conjunction with the following drawings, in which.

Figure 1:
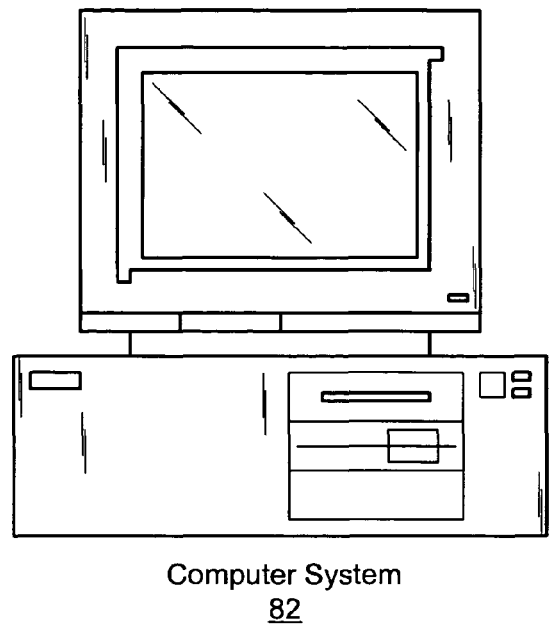
FIG. 1 illustrates a computer system operable to programmatically determine calling information of a graphical program.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 2003/0145280 (Ser. No. 10/056,853) titled "Test Executive System Having XML Reporting Capabilities," filed Jan. 25, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

FIG. 1 illustrates a computer system 82 operable to programmatically or automatically determine calling information of a graphical program. In various embodiments, the computer system 82 may comprise any kind of computer system. The computer system 82 may include a memory medium(s) on which one or more computer programs or software components may be stored. A first computer program may be executed by the computer 82 to receive a request to determine calling information or interface information of a graphical program. For example, in one embodiment a function or method may be associated with the first program, and a second program may invoke the function or method to request the first program to programmatically determine calling information of a particular graphical program. In another embodiment, the computer system 82 may act as a computer server to which the second program may send the request to determine the calling information using a communication protocol.

The first program may receive the request and may programmatically determine calling information or interface information of the graphical program, e.g., by programmatically analyzing one or more files or data structures representing the graphical program. The programmatically determined calling information may then be returned to the second program. The second program may then formulate a function or method call to invoke execution of the graphical program by using the dynamically discovered calling information.

Figure 1A:
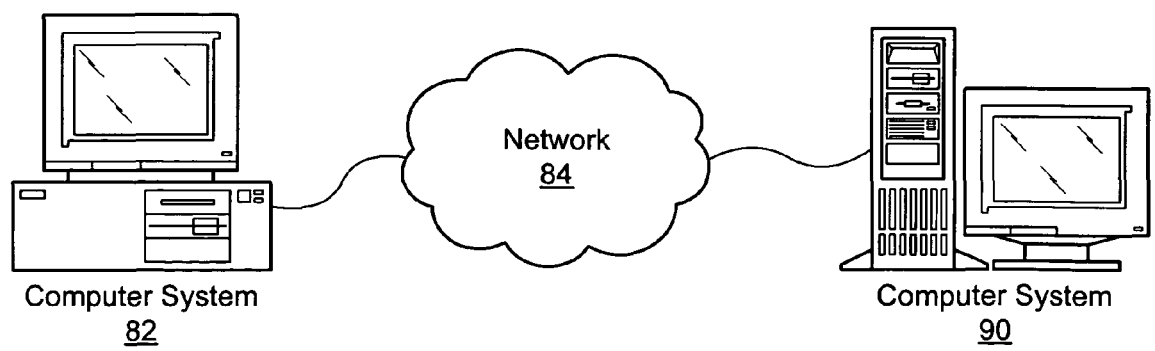
FIG. 1A illustrates a network system comprising two or more computer systems that may implement an embodiment of the present invention.

In one embodiment, the second program that requests the first program to programmatically discover the calling information of the graphical program may also be executed and/or stored on the computer 82. In another embodiment, the second program may be executed and/or stored on another computer system, such as the computer system 90 illustrated in FIG. 1A. In FIG. 1A, the computer system 90 is coupled to the computer system 82 via a network 84. The network 84 may comprise any type of network or combination of networks, including a LAN (local area network), WAN (wide area network), the Internet, or an Intranet, among others. Thus, in one embodiment the second program may execute on the computer 90 to communicate via the network 84 with the first program executing on the computer 82 to request the first program to programmatically determine calling information or interface information of a graphical program.

In various embodiments, the graphical program for which the second program requests calling information may be stored in any of various locations relative to the computer system(s) on which the first program and the second program execute. For example, in one embodiment, the first program and the second program may each execute on the computer 82, and the graphical program may be stored on the computer 82. In another embodiment, the first program may execute on the computer 82, the second program may execute on the computer 90, and the graphical program may be stored on either the computer 82 or the computer 90. In another embodiment, the first program may execute on the computer 82, the second program may execute on the computer 90, and the graphical program may be stored on another computer system. In another embodiment, the first program and the second program may each execute on the computer 82, and the graphical program may be stored on another computer system. Thus, in various embodiments, when the second program invokes execution of the graphical program, the graphical program may either execute locally on the same computer system as the second program or may execute remotely on a different computer system than the second program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include quality assurance testing, hardware-in-the-loop testing, and rapid control prototyping, among others.

However, it is noted that the present invention may be utilized in a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
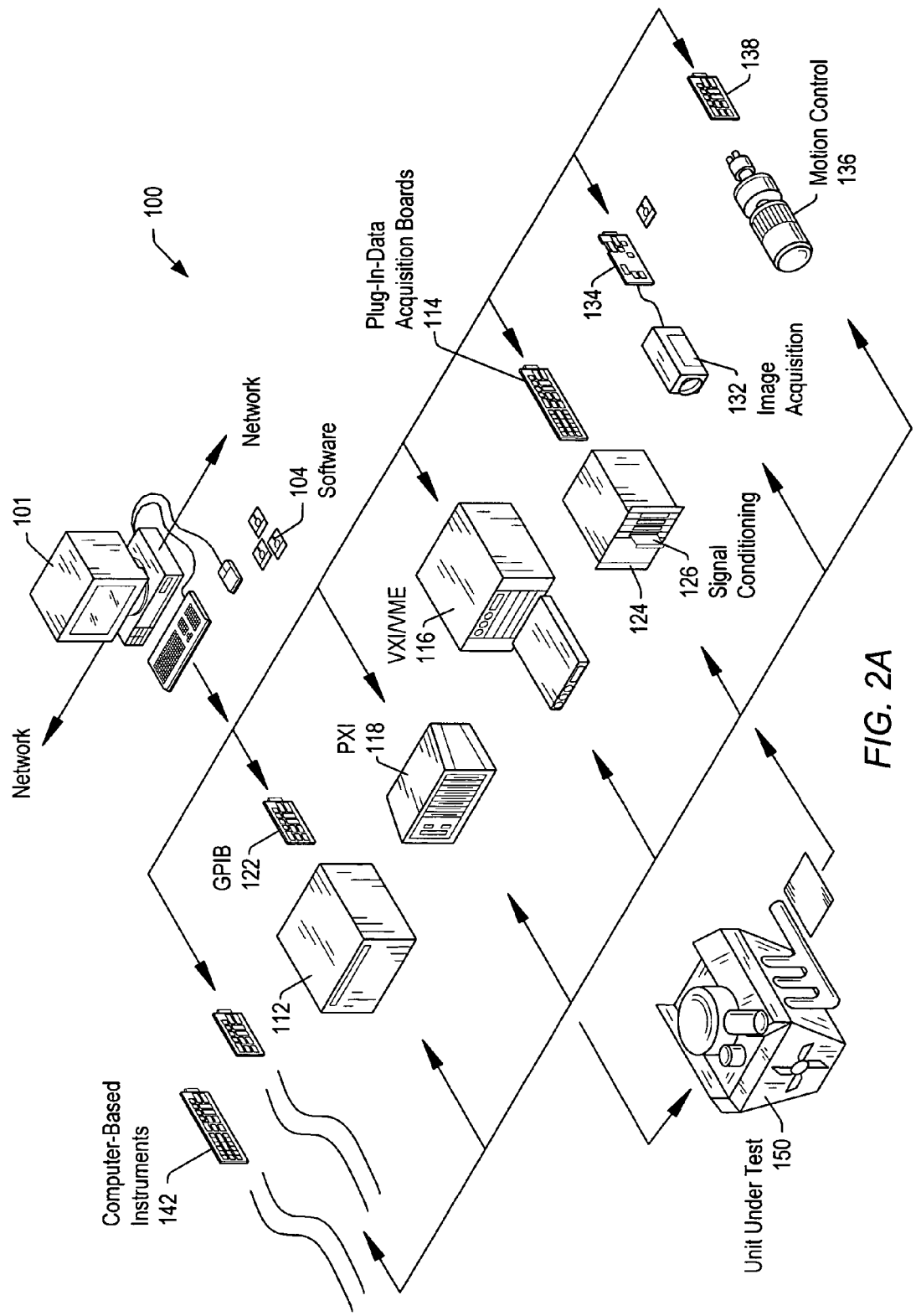
FIG. 2A illustrates an exemplary instrumentation control system.

FIG. 2A illustrates an exemplary instrumentation control system 100 in which the ability to programmatically determine calling information of a graphical program may be utilized. The system 100 comprises a host computer 101 which connects to one or more instruments. The host computer 101 may comprise a CPU, a display screen, memory, and one or more input devices such as a mouse or keyboard as shown.

The computer 101 may execute a graphical program to operate with the one or more instruments to analyze, measure, or control a unit under test (UUT) or process 150. For example, a second program may request a first program to programmatically determine calling information of the graphical program and may then utilize the discovered calling information to invoke execution of the graphical program on the host computer 101. In various embodiments, the host computer 101 may be the computer 82, the computer 90, or another computer system, as discussed above.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
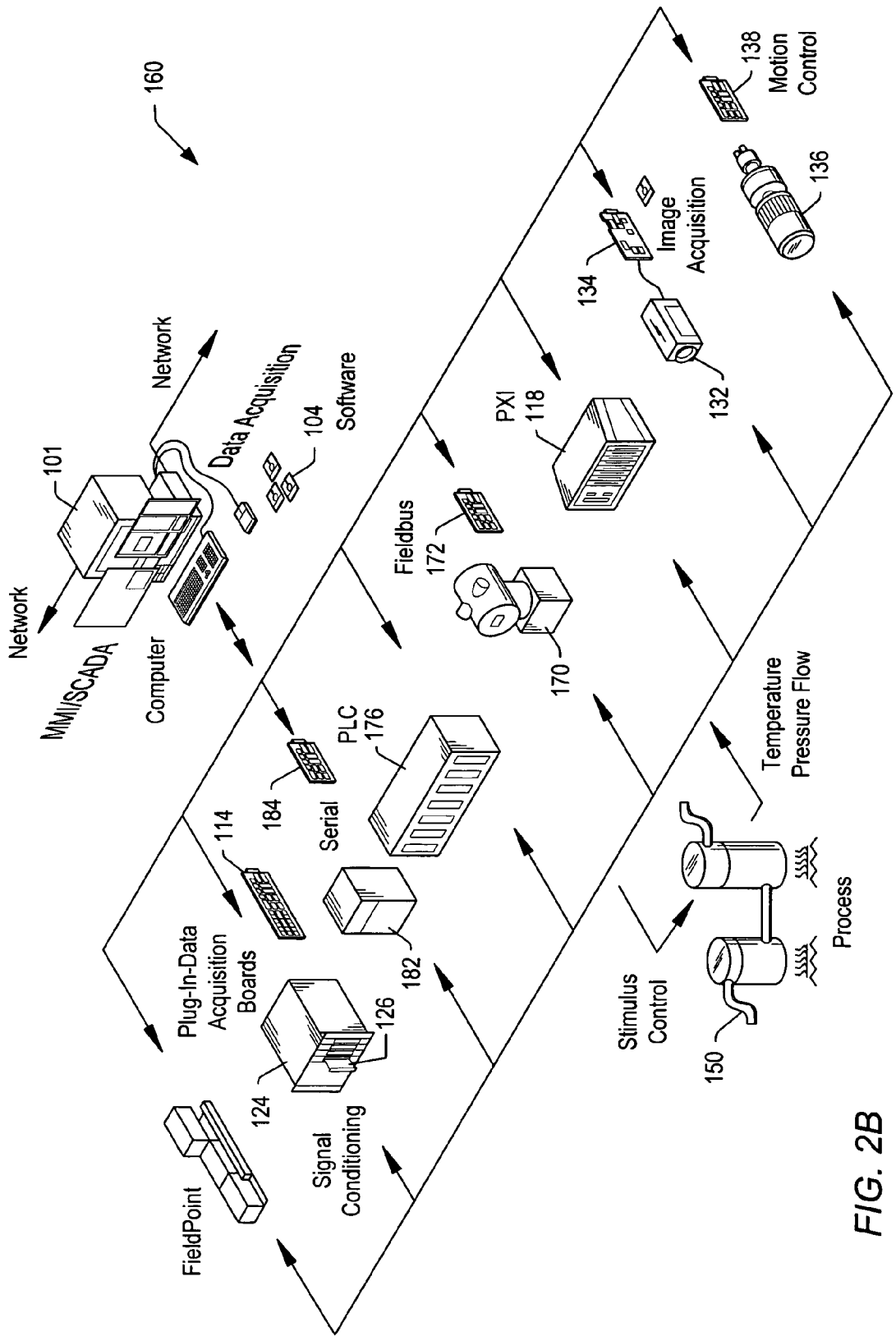
FIG. 2B illustrates an exemplary industrial automation system.

FIG. 2B illustrates an exemplary industrial automation system 160 in which the ability to programmatically determine calling information of a graphical program may be utilized. The industrial automation system 160 is similar to the instrumentation or test and measurement system 100 shown in FIG. 2A. Elements which are similar or identical to elements in FIG. 2A have the same reference numerals for convenience. The system 160 may comprise a computer 101 which connects to one or more devices or instruments. The computer 101 may comprise a CPU, a display screen, memory, and one or more input devices such as a mouse or keyboard as shown.

The computer 101 may execute a graphical program to operate with the one or more devices to a process or device 150 to perform an automation function, such as MMI (Man Machine Interface), SCADA (Supervisory Control and Data Acquisition), portable or distributed data acquisition, process control, advanced analysis, or other control. For example, a second program may request a first program to programmatically determine calling information of the graphical program and may then utilize the discovered calling information to invoke execution of the graphical program on the computer 101. In various embodiments, the host computer 101 may be the computer 82, the computer 90, or another computer system, as discussed above.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
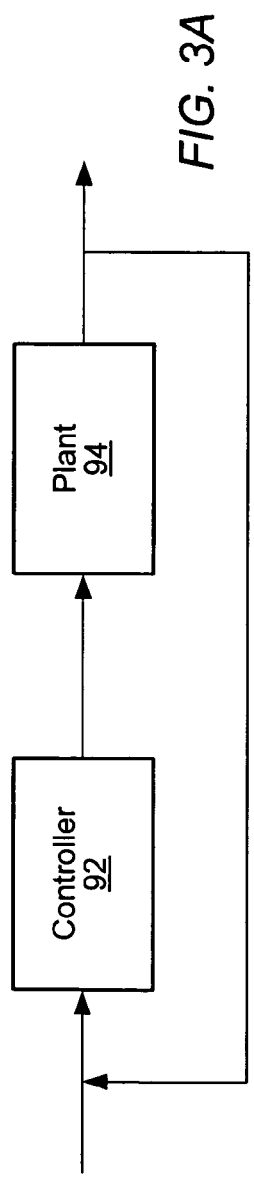
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
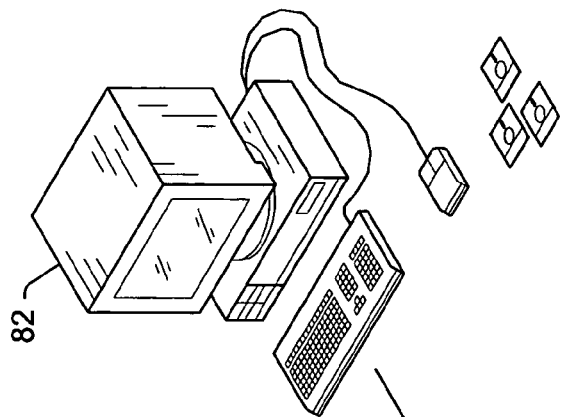
FIG. 3B illustrates an exemplary system which may perform control and/or simulation functions utilizing graphical programs.
Figure 3B:
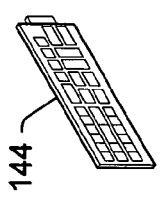

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented a real physical system, e.g., a car engine.

In one embodiment, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a RTOS, or a device including a programmable hardware element.

In one embodiment, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 believe that it is connected to a real plant, e.g., a real engine.

In the embodiments of FIGS. 2A, 2B, and 3A above, one or more of the various devices may couple to each other over a network, such as the Internet. In one embodiment, the user operates to select a target device from a plurality of possible target devices for programming or configuration using a graphical program. Thus the graphical program may be created on a computer and deployed on a target device that is remotely located from the computer and coupled to the computer through a network. In one embodiment, execution of the graphical program may be invoked by a program that dynamically discovers calling information or interface information of the graphical program, similarly as described above.

Graphical software programs which perform data acquisition, analysis and/or presentation, e.g., for measurement, instrumentation control, industrial automation, modeling, or simulation, such as in the applications shown in FIGS. 2A, 2B, and 3A, may be referred to as virtual instruments.

Figure 4:
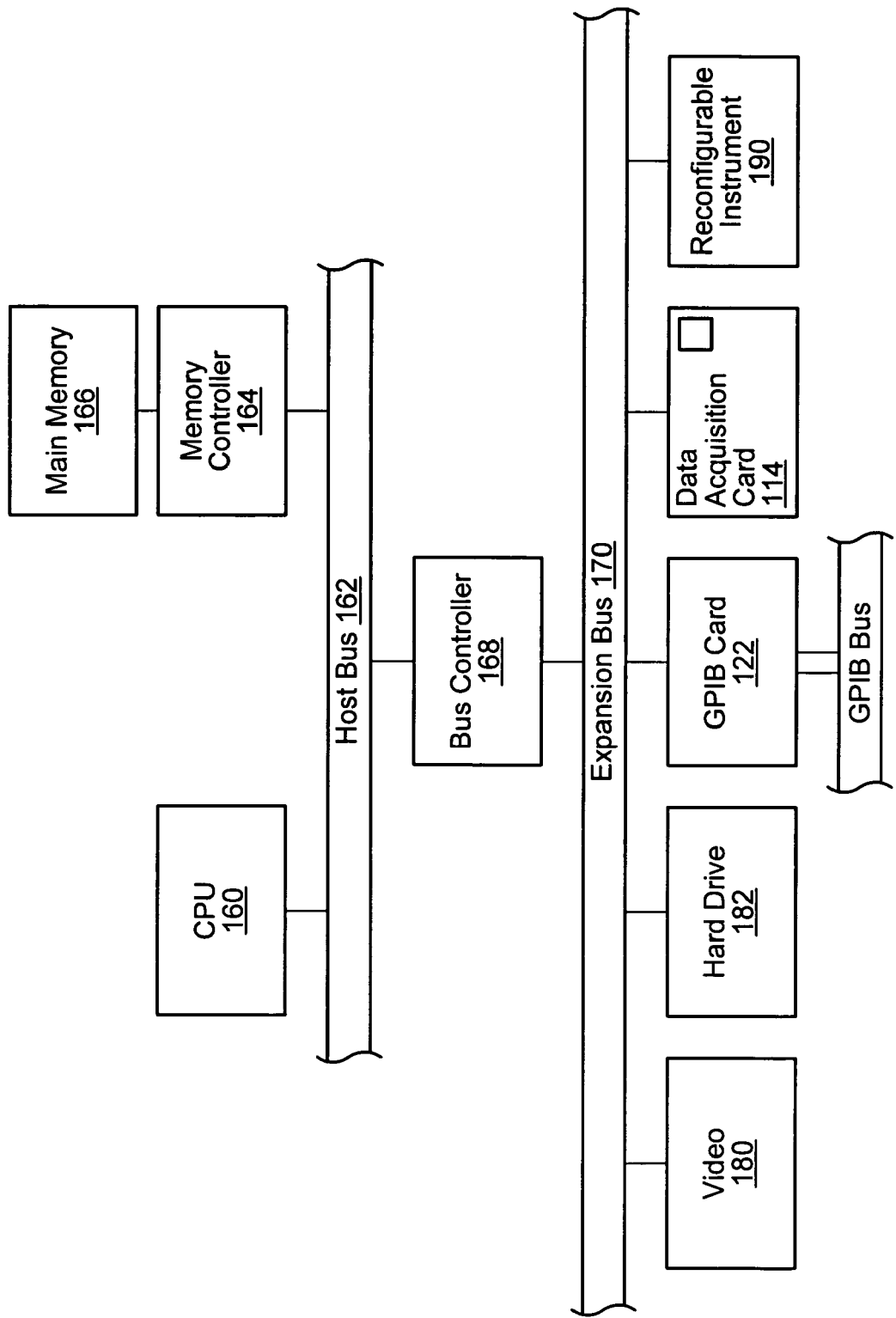
FIG. 4 is an exemplary block diagram of the computer systems of FIGS. 1, 1A, 2A, 2B and 3B.

FIG. 4—Computer System Block Diagram

FIG. 4 is a block diagram representing one embodiment of the computer systems 82, 90, and/or 101 illustrated in FIGS. 1, 1A, 2A, and 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164.

In one embodiment, the main memory 166 may store a first program operable to programmatically determine calling information or interface information of a graphical program, as described above. In one embodiment, the first program may be associated with or may be a part of a graphical programming development environment. In this embodiment, other software associated with the graphical programming development environment may also be stored in the main memory 166. In another embodiment, the main memory 166 may store a second program operable to receive programmatically determined calling information or interface information of a graphical program and invoke execution of the graphical program according to the received information, as described above. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

FIG. 4 may also represent a computer system on which the graphical program is executed. In this case, main memory 166 may store the graphical program whose calling information is programmatically determined. In another embodiment, the graphical program may be executed on a device coupled to the computer. For example, FIG. 4 illustrates a device 190 connected to the computer. The device 190 may include a processor and memory which may execute a real time operating system. The device 190 may also or may instead comprise a programmable hardware element. The computer system may be operable to deploy the graphical program to the device 190 for execution of the graphical program on the device 190. In one embodiment, the deployed graphical program may take the form of data structures that directly represent the graphical program. Alternatively, the deployed graphical program may take the form of text code (e.g., C code) generated from the graphical program. In another embodiment, the deployed graphical program may take the form of compiled code that was generated from either the graphical program or from text code that in turn was generated from the graphical program.

Figure 5:
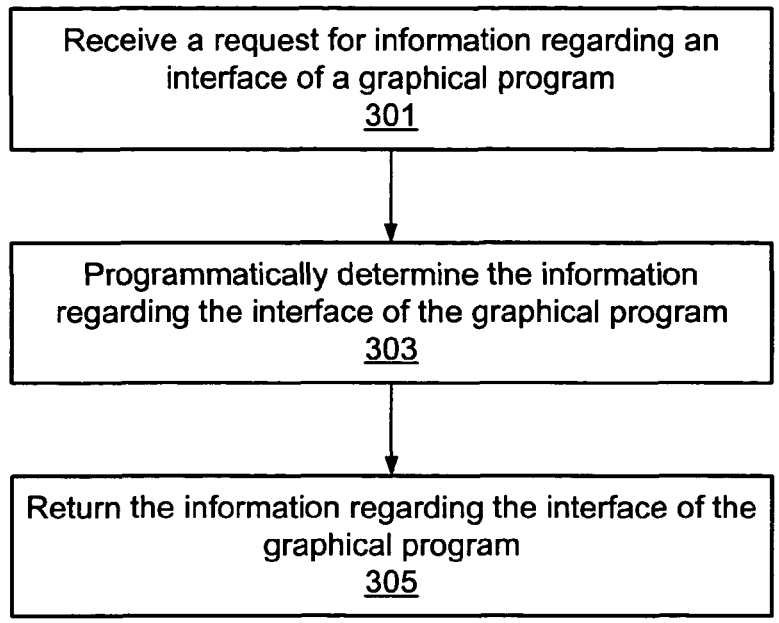
FIG. 5 is a flowchart diagram illustrating one embodiment of a method for programmatically determining calling information or interface information of a graphical program.

FIG. 5—Programmatically Determining Calling Information of a Graphical Program FIG. 5 is a flowchart diagram illustrating one embodiment of a method for programmatically determining calling information or interface information of a graphical program. It is noted that FIG. 5 illustrates a representative embodiment, and alternative embodiments are contemplated.

In 301, a request for information regarding an interface of a graphical program may be received. For example, the request may be received by a first program such as described above with reference to FIG. 1. The interface information for the graphical program may include information necessary to invoke execution of the graphical program. Thus, the interface information is also referred to herein as "calling information". The interface information may include such information as parameters of the graphical program, their respective data types, and whether each parameter is an input parameter, an output parameter, or both.

In one embodiment, the first program may have an associated method or function that a second program may call to request the first program to programmatically determine the information regarding the interface of the graphical program. Thus, receiving the request for information regarding the interface of the graphical program may comprise this method or function being invoked. In another embodiment, receiving the request for information regarding the interface of the graphical program may comprise the first program receiving the request in other ways, such as a message request received via a network. For example, the first program may support a communication protocol allowing the second program to send a message requesting the interface information for the graphical program.

The request received in 301 may include information identifying the particular graphical program(s) for which interface information is needed. The graphical program(s) may be identified in various ways, e.g., using a name, a unique ID, a file pathname, etc.

In 303, the information regarding the interface of the graphical program may be programmatically determined. For example, the first program may retrieve or access one or more data structures representing the graphical program and may programmatically analyze the one or more data structures to determine the information regarding the interface of the graphical program. The one or more data structures may be stored on any of various memory mediums, such as a memory medium of the local computer system on which the first program executes or a memory medium of a remote computer system. Programmatically analyzing the one or more data structures may include any technique or method implemented by the first program to determine the interface information from the one or more data structures.

In another embodiment, the first program may not determine the interface information from data structures that directly represent the graphical program, but may instead determine the interface information from other information. For example, in one embodiment the first program may determine the interface information from a file or database that stores interface information or meta-data regarding various graphical programs.

As noted above, programmatically determining the interface information may include programmatically determining parameters for invoking the graphical program. Data types of the parameters may also be programmatically determined. In one embodiment, one or more of the parameters may have default values. Thus, default values for the parameters may also be programmatically determined.

In 305, the programmatically determined information regarding the interface of the graphical program may be returned. For example, if the request in 301 was received in a method or function call, the programmatically determined information may be returned to the caller of the method or function using standard techniques. If the request in 301 was received in a message sent via a network (or passed from another program), the programmatically determined information may be sent to the sender of the original message in a response message.

In various embodiments, the information returned in 305 may comprise data of any kind and may be structured in various ways. In one embodiment, one or more data structures may be passed to the first program when the first program receives the request for the interface information in 301, and the first program may fill out the one or more data structures with information regarding the interface of the graphical program. In another embodiment, the first program may generate text data describing the interface information and may return the text data. For example, in one embodiment the first program may generate XML data describing the interface information and may return the XML data. For example, XML data may be utilized to describe data types of parameters for invoking the graphical program.

Figure 6:
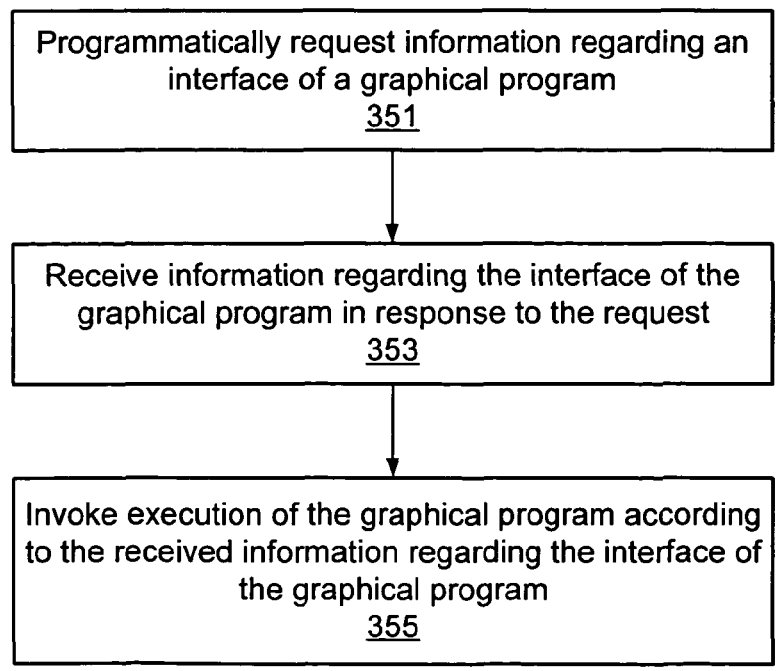
FIG. 6 is a flowchart diagram illustrating one embodiment of a method for requesting calling information of a graphical program.

FIG. 6—Requesting Calling Information of a Graphical Program

FIG. 6 is a flowchart diagram illustrating one embodiment of a method for requesting calling information of a graphical program. It is noted that FIG. 6 illustrates a representative embodiment, and alternative embodiments are contemplated.

In 351, a program, e.g., the second program described above with reference to FIG. 1 and FIG. 5, may programmatically request information regarding an interface of a graphical program. As described above with reference to 301 of FIG. 5, the second program may request the interface information (also referred to as calling information) by calling a method or function of a first program or sending a message to the first program.

In various embodiments, the second program may be operable to perform any application and may need to invoke execution of the graphical program for any of various purposes. In one embodiment, the second program may be (or may be associated with) a test executive application for performing automated tests of units under test (UUTs). For example, a user of the test executive application may create a test sequence including a plurality of steps. The user may configure various steps to invoke program modules. For example, the program modules may execute to interact with one or more instruments such as shown in FIGS. 2A and 2B to test a UUT. In one embodiment, a program module may be implemented as a graphical program. Thus, the test executive application may communicate with a first program to request interface information of the graphical program to be programmatically determined.

The first program may programmatically determine the interface information of the graphical program and return the interface information to the second program, as described above with reference to FIG. 5. In 353, the second program may receive the information regarding the interface of the graphical program. As described above, the information received may include data of any kind and may be structured or formatted in any of various ways.

In 355, the second program may invoke execution of the graphical program according to the received information regarding the interface of the graphical program. Execution of the graphical program may be invoked in various ways, e.g., depending on invocation models supported by the graphical program or supported by an execution subsystem of the graphical programming development environment used to create the graphical program. For example, in one embodiment, the graphical program may be invoked directly. In another embodiment, the graphical program may be invoked indirectly by requesting an execution subsystem to invoke the graphical program. In one embodiment, the graphical program may be executed on the same computer system that executes the second program. In another embodiment, the graphical program may be executed on a remote computer system.

Invoking execution of the graphical program may comprise passing one or more parameters to the graphical program, as specified by the interface information received in 353. For example, for each parameter specified by the interface information, the second program may create or pass an invocation parameter of the specified data type. If the interface information specifies default values for the parameters, then the appropriate default value may be passed for each respective parameter.

Exemplary LabVIEW Implementation

Details regarding one specific implementation for programmatically determining interface information for LabVIEW graphical programs (also referred to as VIs) are described below. It is noted, however, that various embodiments of the methods described above may be utilized to programmatically determine interface information for various kinds of graphical programs.

Figure 7:
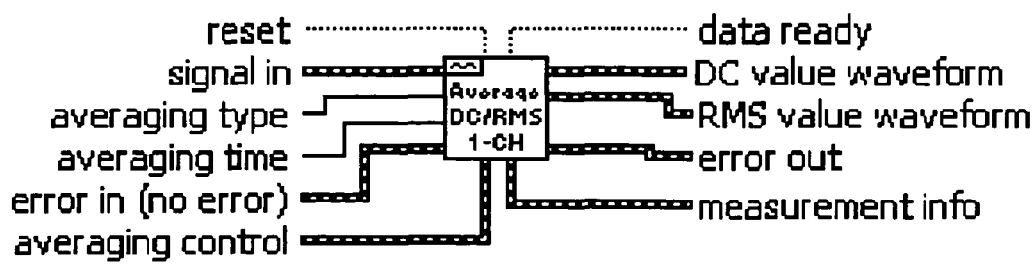
FIG. 7 illustrates an exemplary help image of an exemplary graphical program.

In one embodiment, an ActiveX server associated with the LabVIEW graphical programming development environment may export a method enabling calling programs to request interface information for a VI. In one embodiment, the method may include the following output parameters:

- image: The help image of the VI with captions. FIG. 7 illustrates an exemplary help image of an exemplary VI.
- numConnections: The number of connections in the connector pane of the VI. In the example VI of FIG. 7, the number of connections is 11, since the VI has six input parameters (indicated by connections on the left side of the VI) and five output parameters (indicated by connections on the right side of the VI).
- whiskerRects: This parameter describes the location of connectors in the image returned by the method. WhiskerRects is an array of structures where each structure describes a rectangle. In the image of FIG. 7, the first element might be for the input parameter "averaging time". The whiskerRect for this might be [148, 15, 156, 23] for left, top, right, and bottom.
- termNameRects—Similar to the whiskerRects parameter, except that it describes the location names in the image.
- captions—An array of strings specifying the captions shown in the help image for each parameter of the VI. The captions for the image of FIG. 7 would be 'reset', 'signal in', 'averaging type', etc.
- wireRequirements—An array of values that specify whether each of the VI's parameters is required (0), recommended (1), or optional (2).
- ioStatus—An array of values that specify whether each of the VI's parameters is an input parameter (0) or output parameter (1).
- conNum—An array of values that specify the parameter number for each parameter.
- dataTypes—An array of XML strings that describe the data types for the VI's parameters. For example, the XML string for the "averaging time" input parameter in the VI of FIG. 7 may be the following:

```
<DBL>
<Name>averaging time</Name>
<Val>-1.00000</Val>
</DBL>
```

As another example, the XML string for the "error in (no error)" input parameter in the VI of FIG. 7 may be the following:

```
<Cluster>
<Name>error in (no error)</Name>
<NumElts>3</NumElts>
<Boolean>
<Name>status</Name>
<Val>0</Val>
</Boolean>
<I32>
<Name>code</Name>
<Val>0</Val>
</I32>
<String>
<Name>source</Name>
<Val></Val>
</String>
</Cluster>
```

Exemplary Test Executive Application

Figure 8:
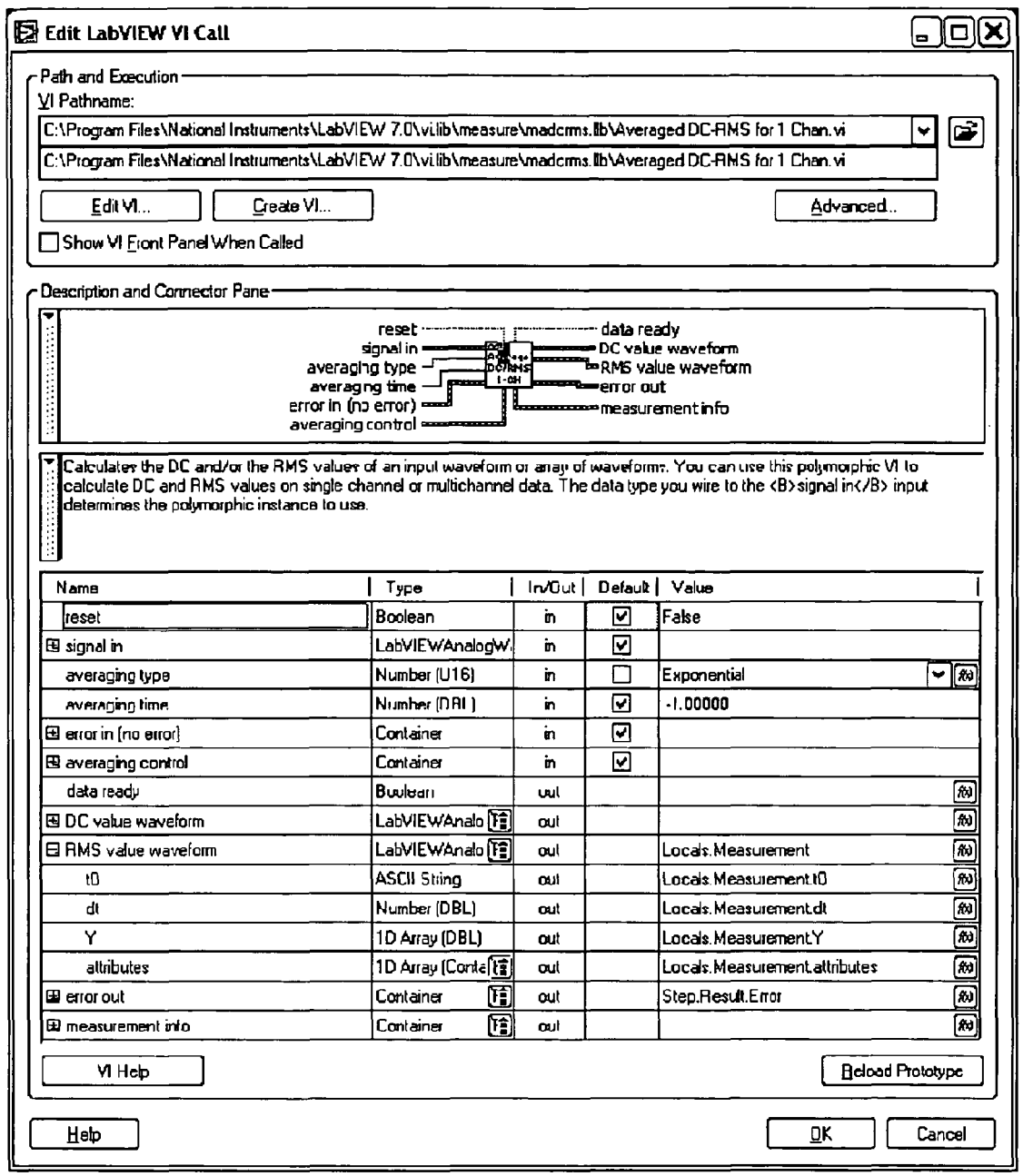
FIG. 8 illustrates a window for enabling a user to configure a graphical program invocation.

As described above, in one embodiment a test executive application may utilize the ability to dynamically discover interface information for a graphical program. FIG. 8 illustrates a window for enabling a user to configure a graphical program invocation. The configured invocation may then be utilized to invoke execution of the graphical program, e.g., to invoke the graphical program during execution of a test executive sequence.

As shown, the user may specify a file path to the graphical program (VI) in the top portion of the window. The test executive application may then programmatically request interface information for the specified VI as described above. For example, the image of the VI may be obtained and displayed in the window, as shown in FIG. 8. The parameters of the VI may also be determined and displayed, as shown in the bottom portion of the window of FIG. 8.

The parameters of the VI are listed in a list/tree control that has five columns. The first column displays the names of the parameters. These names match the labels shown in the help image for the VI. This column is read-only.

The second column shows the data types of the parameters that the test executive application utilizes. These data types may be the same data types as specified in the graphical program itself or may be mapped to equivalent data types supported by the test executive application.

The third column indicates whether each parameter is an input parameter or an output parameter.

The fourth column allows the user to use the default value of each parameter. If the checkbox is checked, the default value for the parameter is displayed in the fifth column. For arrays and clusters, the default value applies to the whole array and cluster.

The fifth column is where the user can enter an expression that defines the desired values to use for each input parameter or the destination of the data in the test executive system for each output parameter. These values may be passed to the VI when the VI is invoked. To help the user create an expression, there is a button at the end of the edit control that brings up an Expression Browser dialog. If the parameter is expecting an enumerated type, a drop-down list is shown with all the possible values.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium storing program instructions executable by a processor to:

receive from a requesting program a request to determine an invocation interface of a graphical program, wherein the invocation interface is usable to invoke execution of the graphical program, wherein the graphical program is stored on a first computer system, wherein the requesting program executes on a second different computer system;

programmatically determine the invocation interface of the graphical program in response to the request, wherein programmatically determining the invocation interface includes programmatically determining one or more parameters that should be passed to the graphical program when invoking execution of the graphical program, wherein said programmatically determining the one or more parameters includes programmatically determining default values of the one or more parameters; and return information specifying the invocation interface of the graphical program to the requesting program, wherein said returning includes returning information specifying the one or more parameters that should be passed to the graphical program, wherein the information specifying the one or more parameters includes information specifying the default values of the one or more parameters;

wherein the information specifying the invocation interface of the graphical program is useable by the requesting program to invoke execution of the graphical program.

2. The non-transitory computer accessible memory medium of claim 1, wherein said programmatically determining the one or more parameters comprises programmatically determining data types of the one or more parameters; and wherein said returning the information specifying the one or more parameters comprises returning information specifying the data types of the one or more parameters.

3. The non-transitory computer accessible memory medium of claim 2, further storing program instructions executable by a processor to:

generate data describing the data types of the parameters for invoking the graphical program;

wherein said returning the information specifying the data types of the parameters for invoking the graphical program comprises returning the data describing the data types.

4. The non-transitory computer accessible memory medium of claim 2, further storing program instructions executable by the processor to:

generate XML data describing the data types of the one or more parameters that should be passed to the graphical program when invoking execution of the graphical program;

wherein said returning the information specifying the data types of the one or more parameters comprises returning the XML data describing the data types.

5. The non-transitory computer accessible memory medium of claim 1, wherein said programmatically determining the invocation interface of the graphical program comprises programmatically analyzing one or more data structures representing the graphical program to determine the invocation interface of the graphical program.

6. The non-transitory computer accessible memory medium of claim 1, wherein the graphical program comprises a plurality of interconnected nodes that visually indicate functionality of the graphical program.

7. The non-transitory computer accessible memory medium of claim 1, wherein the graphical program comprises a graphical data flow program.

8. The non-transitory computer accessible memory medium of claim 1, wherein the graphical program comprises a block diagram portion and a user interface portion.

9. The non-transitory computer accessible memory medium of claim 1, wherein said receiving the request to determine the invocation interface of the graphical program comprises receiving an invocation of one of a method or a function.

10. The non-transitory computer accessible memory medium of claim 1, wherein said receiving the request to determine the interface of the graphical program comprises receiving a message requesting the invocation interface of the graphical program.

11. A non-transitory computer accessible memory medium storing program instructions, wherein the program instructions are stored on a first computer system, wherein the program instructions are executable by a processor to:

programmatically request information specifying an invocation interface of a graphical program, wherein the invocation interface is usable to invoke execution of the graphical program, wherein the graphical program is stored on a second computer system different from the first computer system, wherein requesting the information specifying the invocation interface includes requesting information specifying one or more parameters that should be passed to the graphical program when invoking execution of the graphical program, wherein said requesting the information specifying the one or more parameters includes requesting information specifying default values of the one or more parameters;

receive the information specifying the invocation interface of the graphical program in response to the request, wherein receiving the information specifying the invocation interface includes receiving the information specifying the one or more parameters that should be passed to the graphical program when invoking execution of the graphical program, wherein receiving the information specifying the one or more parameters includes receiving the information specifying the default values of the one or more parameters; and invoke execution of the graphical program using the received information specifying the invocation interface of the graphical program, wherein said invoking includes passing the one or more parameters to the graphical program.

12. The non-transitory computer accessible memory medium of claim 11, wherein said receiving the information specifying the one or more parameters comprises receiving information specifying data types of the one or more parameters; and wherein said passing the one or more parameters to the graphical program comprises passing one or more parameters having the specified data types.

13. The non-transitory computer accessible memory medium of claim 11, wherein said passing the one or more parameters to the graphical program includes passing one or more parameters having the default values specified by the information.

14. The non-transitory computer accessible memory medium of claim 11, wherein the graphical program comprises a plurality of interconnected nodes that visually indicate functionality of the graphical program.

15. The non-transitory computer accessible memory medium of claim 11, wherein the graphical program comprises a graphical data flow program.

16. The non-transitory computer accessible memory medium of claim 11, wherein said programmatically requesting the information specifying the invocation interface of the graphical program comprises calling one or more methods or one or more functions to request the information specifying the invocation interface of the graphical program.

17. The non-transitory computer accessible memory medium of claim 11,
wherein said programmatically requesting the information specifying the invocation interface of the graphical program comprises programmatically sending a message to request the information specifying the invocation interface of the graphical program.

18. A computer-implemented method comprising:
utilizing a computer to perform:
receiving from a requesting program a request to determine an invocation interface of a graphical program, wherein the invocation interface is usable to invoke execution of the graphical program, wherein the graphical program is stored on a first computer system, wherein the requesting program executes on a second different computer system;
programmatically determining the invocation interface of the graphical program in response to the request, wherein programmatically determining the invocation interface includes programmatically determining one or more parameters that should be passed to the graphical program when invoking execution of the graphical program, wherein said programmatically determining the one or more parameters includes programmatically determining default values of the one or more parameters; and
returning information specifying the invocation interface of the graphical program to the requesting program, wherein said returning includes returning information specifying the one or more parameters that should be passed to the graphical program, wherein the information specifying the one or more parameters includes information specifying the default values of the one or more parameters;
wherein the information specifying the invocation interface of the graphical program is used by the requesting program to invoke execution of the graphical program.

19. A computer-implemented method, wherein the method is performed by a first computer system, the method comprising:
programmatically requesting information specifying an invocation interface of a graphical program, wherein the invocation interface is usable to invoke execution of the graphical program, wherein the graphical program is stored on a second computer system different from the first computer system, wherein requesting the information specifying the invocation interface includes requesting information specifying one or more parameters that should be passed to the graphical program when invoking execution of the graphical program, wherein said requesting the information specifying the one or more parameters includes requesting information specifying default values of the one or more parameters;
receiving the information specifying the invocation interface of the graphical program in response to the request, wherein receiving the information specifying the invocation interface includes receiving the information specifying the one or more parameters that should be passed to the graphical program when invoking execution of the graphical program, wherein receiving the information specifying the one or more parameters includes receiving the information specifying the default values of the one or more parameters; and
invoking execution of the graphical program using the received information specifying the invocation interface of the graphical program, wherein said invoking includes passing the one or more parameters to the graphical program.

20. A computer-implemented method comprising:
a test executive application programmatically requesting information specifying an invocation interface of a stored graphical program, wherein the invocation interface is usable to invoke execution of the graphical program, wherein requesting the information specifying the invocation interface includes requesting information specifying one or more parameters that should be passed to the graphical program when invoking execution of the graphical program, wherein said requesting the information specifying the one or more parameters includes requesting information specifying default values of the one or more parameters;
the test executive application receiving the information specifying the invocation interface of the graphical program in response to the request, wherein receiving the information specifying the invocation interface includes receiving the information specifying the one or more parameters that should be passed to the graphical program when invoking execution of the graphical program, wherein receiving the information specifying the one or more parameters includes receiving the information specifying the default values of the one or more parameters; and
the test executive application invoking execution of the graphical program using the received information specifying the invocation interface of the graphical program, wherein said invoking includes passing the one or more parameters to the graphical program.

21. A system comprising:
one or more processors;
memory storing program instructions;
wherein the program instructions stored in the memory are executable by the one or more processors to:
receive from a requesting program a request to determine an invocation interface of a graphical program, wherein the invocation interface is usable to invoke execution of the graphical program, wherein the graphical program is stored on a first computer system, wherein the requesting program executes on a second different computer system;
programmatically determine the invocation interface of the graphical program in response to the request, wherein programmatically determining the invocation interface includes programmatically determining one or more parameters that should be passed to the graphical program when invoking execution of the graphical program, wherein said programmatically determining the one or more parameters includes programmatically determining default values of the one or more parameters; and
return information specifying the invocation interface of the graphical program to the requesting program, wherein said returning includes returning information specifying the one or more parameters that should be passed to the graphical program, wherein the information specifying the one or more parameters includes information specifying the default values of the one or more parameters;

wherein the information specifying the invocation interface of the graphical program is useable by the requesting program to invoke execution of the graphical program.

22. A first computer system comprising:
one or more processors;
memory storing program instructions;
wherein the program instructions stored in the memory are executable by the one or more processors to:
  programmatically request information specifying an invocation interface of a graphical program, wherein the invocation interface is usable to invoke execution of the graphical program, wherein the graphical program is stored on a second computer system different from the first computer system, wherein requesting the information specifying the invocation interface includes requesting information specifying one or more parameters that should be passed to the graphical program when invoking execution of the graphical program, wherein said requesting the information specifying the one or more parameters includes requesting information specifying default values of the one or more parameters;
  receive the information specifying the invocation interface of the graphical program in response to the request, wherein receiving the information specifying the invocation interface includes receiving the information specifying the one or more parameters that should be passed to the graphical program when invoking execution of the graphical program, wherein receiving the information specifying the one or more parameters includes receiving the information specifying the default values of the one or more parameters; and
  invoke execution of the graphical program using the received information specifying the invocation interface of the graphical program, wherein said invoking includes passing the one or more parameters to the graphical program.

* * * * *